(12) United States Patent
Chan

(10) Patent No.: US 6,393,599 B1
(45) Date of Patent: May 21, 2002

(54) MULTI-CHIP DATA DETECTOR IMPLEMENTATION FOR SYMMETRIC DIFFERENTIAL PHASE SHIFT KEYING MODULATION FORMATS

(75) Inventor: Andy Chan, Los Angeles, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/347,873

(22) Filed: Jul. 6, 1999

(51) Int. Cl.[7] ............................................... G06F 11/08
(52) U.S. Cl. ....................................................... 714/797
(58) Field of Search ................................ 714/760, 797; 375/244, 330, 331

(56) References Cited

U.S. PATENT DOCUMENTS 4,942,591 A * 7/1990 Nease et al. .................. 375/84

OTHER PUBLICATIONS

Fischer et al., Performance of coded modulation employing differential encoding over rayleigh fading channels, IEEE, p. 122–123, 1–1999.*
Kojima et al., An Improved differential detection scheme based on maximum likelihood sequence estimation, Mitsubishi Electrical Advance, p. 14–16, Sep. 1998.*
"Multi–Symbol Detection Scheme for SDPSK," by D. D. Sammons, TRW Interoffice Correspondence, MDR–92–M1001–118, Nov. 24, 1992, pp. 1–8.
"Multiple–Symbol Differential Detection of MPSK," by Divsalar and Simon, IEEE Transactions on Communications, Mar. 1990, pp. 300–308.

* cited by examiner

Primary Examiner—Albert Decady
Assistant Examiner—Shelly A Chase
(74) Attorney, Agent, or Firm—Antonelli, Terry, Stout & Kraus, LLP

(57) ABSTRACT

A multi-chip data decoder implemented for symmetric differential phase shift keying (SDPSK) or symmetric differential quadriphase shift keying (SDQPSK) modulation formats which uses multiple-chip observation intervals to improve performance over conventional symbol-to-symbol differential detection. Input phases $\phi_k$, $\phi_{k-1}$, $\phi_{k-2}$, and $\phi_{k-3}$ are detected by comparing a received vector of data bits and parity bits, which contains phase transition information over multiple chips, to the set of ideal vectors of data bits and parity bits, which contain all phase transition possibilities over that set of chips in a noiseless environment. The multi-chip data detector for decoding incoming modulated data comprises a phase-difference encoder (10, 100) arranged to encode phase-differences $\phi_{k-2}-\phi_{k-3}$, $\phi_{k-1}-\phi_{k-2}$, $\phi_k-\phi_{k-1}$, $\phi_k-\phi_{k-2}$, $\phi_{k-1}-\phi_{k-3}$, and $\phi_k-\phi_{k-3}$ of the incoming modulated data during a multiple-chip observation interval to produce a received vector of a predetermined number of data bits and parity bits; a decoder (20, 200) arranged to decode the received vector to produce multiple bit decisions by mapping the received vector with a set of ideal vectors; and a majority voter (30, 300) arranged to choose a bit estimate from the multiple bit decisions by way of a majority rule to produce a final detected symbol from the incoming modulated data during the multiple-chip observation interval. The multi-chip data detection technique performs multiple-chip comparisons in an efficient manner, providing a significant performance and implementation improvement over conventional symbol-to-symbol differential detection while realizing design gate savings of up to 90%.

28 Claims, 6 Drawing Sheets

| Ideal Vectors $\underline{v}$ | 0 | 0 | 0 | 0 | 1 | 1 | 1 | 1 |
|---|---|---|---|---|---|---|---|---|
| | 0 | 0 | 1 | 1 | 0 | 0 | 1 | 1 |
| | 0 | 1 | 0 | 1 | 0 | 1 | 0 | 1 |
| | 1 | 0 | 0 | 1 | 1 | 0 | 0 | 1 |
| | 1 | 1 | 0 | 0 | 0 | 0 | 1 | 1 |
| | 1 | 0 | 0 | 1 | 0 | 1 | 1 | 0 |
| $b_{k-2}$ | 0 | 0 | 0 | 0 | 1 | 1 | 1 | 1 |
| $b_{k-1}$ | 0 | 0 | 1 | 1 | 0 | 0 | 1 | 1 |
| $b_k$ | 0 | 1 | 0 | 1 | 0 | 1 | 0 | 1 |

Majority Voter $$y = x_2x_1 + x_2x_0 + x_1x_0$$ 
_30_

MULTI-CHIP DATA DETECTOR IMPLEMENTATION FOR SYMMETRIC DIFFERENTIAL PHASE SHIFT KEYING MODULATION FORMATS

This invention was made with Government support under Contract No. F04701-97-C-0025 awarded by the U.S. Air Force Space and Missile Systems Center. The Government has certain rights in this invention.

BACKGROUND OF THE INVENTION

1. Technical Field

The present invention relates to an efficient multi-chip data detection technique for decoding any symmetric differential phase shift keying (SDPSK) or symmetric differential quadriphase shift keying (SDQPSK) data, and more particularly, relates to a multi-chip data detector design for symmetric differential phase shift keying (SDPSK) or symmetric different quadriphase shift keying (SDQPSK) modulation format using multiple-chip observation intervals to improve performance.

2. Related Art

Generally, there are several data detection techniques known for detecting data over a mobile channel. A common technique is known as coherent detection for best system performance. An attractive alternative to coherent detection for applications where system simplicity and robustness of implementation take precedence over achieving the best system performance may be differential data detection technique. Differential data detection technique may reduce significant performance losses over a multipath fading channel.

In the past, conventional differential detection of data of different phase shift keying modulation formats has been accomplished by comparing the received phases of two successive symbol intervals and making a multilevel decision based on the difference between the two phases. However, the conventional symbol-to-symbol differential detection commonly suffers from a performance penalty (additional required signal-to-noise ratio SNR at a given bit error rate) when compared to ideal coherent detection. The amount of the performance penalty may be proportional to the number of phases and may be significant when the number of phases is substantially high.

One way of enhancing the performance of the conventional symbol-to-symbol differential detection technique while maintaining a simple and robust differential detection implementation is to use a multiple symbol observation interval longer than two symbol intervals while at the same time making a joint decision on several symbols simultaneously as opposed to symbol-to-symbol detection. General concepts and performance of multiple symbol (multi-chip) differential detection are disclosed in "*Multiple-Symbol Differential Detection Of MPSK*," by D. Divsalar and M. K. Simon, IEEE Transactions on Communications, March 1990, which is incorporated by reference herein. Basically, multi-chip differential detection technique observes the symbols over a longer interval and yields a significant performance gain with lower error rate. Various multi-chip differential detection schemes for symmetric differential phase shift keying (SDPSK) modulation formats such as a 2-chip differential detection, a 3-chip differential detection, and a 4-chip differential detection with "majority rule" processing are described in "*Multi-Symbol Detection Schemes for SDPSK Demodulation*," by D. Sammons, IOC, MDR-02-M1001-118, November 1992, which is incorporated by reference herein. The 4-chip differential detection may offer the most significant performance gain with little impact on hardware complexity. However, if the observation interval is further increased, the performance of the differential detection may improve but the hardware complexity may grow dramatically.

In order to perform multi-chip detection, the received phase string is compared with a set of stored ideal patterns, and a decision is made as to which symbol set was received. There are two methods currently available for multi-chip differential detection. A first method relates to a table lookup technique to index into a stored set of symbol sets. A read-only-memory (ROM) may be used for mapping data bits and parity bits of the received vector relative to ideal vectors for data detection. A second method relates to a one-by-one comparison technique to compare the received phases with ideal pattern and to detect based on maximum likelihood. However, each of these techniques is both hardware and power intensive.

SUMMARY OF THE INVENTION

Accordingly, various embodiments of the present invention are directed to an improved, more efficient multi-chip differential detection technique and a multi-chip data detector hardware for decoding data of a symmetric differential phase shift keying (SDPSK) modulation format with significant performance gain and efficient hardware implementation in terms of gate count, power consumption and processing speed.

In accordance with various embodiments of the present invention, an improved data detector for decoding an incoming data modulated in either a symmetric differential phase shift keying (SDPSK) format or a symmetric differential quadriphase shift keying (SDQPSK) format is provided. The data detector comprises a phase-difference encoder arranged to encode phase-differences of at least four consecutive input phases of incoming modulated data during a multi-chip observation interval to produce a received vector of a predetermined number of data bits and parity bits; a decoder arranged to decode the received vector to produce multiple bit decisions by mapping the received vector with a set of ideal vectors; and a majority voter arranged to choose a bit estimate from the multiple bit decisions by way of a majority rule to produce a final detected symbol from the incoming modulated data during the multi-chip observation interval.

If the incoming data is modulated in a symmetric differential phase shift keying (SDPSK) format from a transmitter, the predetermined number of the received vector corresponds to 3 data bits and 3 parity bits. The multi-chip observation interval corresponds to a 4-chip observation interval with each symbol containing 1 bit, and the set of ideal vectors corresponds to eight (8) phase transition possibilities over the 4-chip observation interval.

The phase-difference encoder block of the SDPSK data detector comprises a plurality of subtractors and XOR gates arranged to determine the phase differences of an input phase of incoming modulated data delayed by one-chip, two-chips and three-chips during the 4-chip observation interval, and to encode the phase differences to produce the received vector of 6-bits.

The decoder block of the SDPSK data detector comprises a vector unit arranged to provide the received vector from the phase-difference encoder block for decoding operations; a first selection unit arranged to receive the data bits of the received vector; a first ROM look-up table arranged to provide the parity bits of the ideal vector having the same data bits; a first mismatch counter arranged to count the number of mismatches between the lookup output with the parity bits of the received vector; a second selection unit arranged to receive the parity bits of the received vector; a second ROM arranged to provide the data bits of the ideal vector having the same parity bits; a second mismatch counter arranged to count the number of mismatches between the lookup output with the data bits of the received vector; and a comparator arranged to pick the ideal vector that is closest to the received vector so as to produce the parallel multiple bit decisions.

The majority voter block of the SDPSK data detector is used to vote on the three decisions of the same symbol. The majority voter block requires three AND gates and one OR gate.

If the incoming data is modulated in a symmetric differential quadri-phase shift keying (SDQPSK) format, the predetermined number of the received vector corresponds to 12-bits of 6 data bits and 6 parity bits. The multi-chip observation interval corresponds to a 4-chip observation interval with each symbol containing 2-bits, and the set of ideal vectors corresponds to sixty-four (64) phase transition possibilities over the 4-chip observation interval.

The phase-difference encoder block of the SDQPSK data detector comprises a plurality of subtractors and XOR gates arranged to determine the phase differences of an input phase of incoming modulated data delayed by one-chip, two-chips and three-chips during the 4-chip observation interval, and to encode the phase differences to produce the received vector.

The decoder block of the SDQPSK data detector comprises a vector unit arranged to provide the received vector of 12-bits from the phase-difference encoder block for decoding operations; a first plurality of selection unit arranged to receive the top 6-bits (data bits) of the received vector and the successive complements of the top 6-bits of the received vector; a first plurality of ROM look-up tables arranged to provide the parity bits of the ideal vector *having the same data bits; a first plurality of mismatch counters arranged to count the number of mismatches between the lookup outputs with the parity bits of the received vector; a second plurality of selection units arranged to receive the bottom 6-bits (parity bits) of the received vector and successive complements of the bottom 6-bits of the received vector; a second plurality of ROM look-up tables arranged to provide the data bits of the ideal vector having the same parity bits; a second plurality of mismatch counters arranged to count the number of mismatches between the lookup outputs with the data bits of the received vector; and a comparator arranged to pick the ideal vector that is closest to the received vector of 12-bits so as to produce parallel detected symbols from the incoming modulated data.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF EMBODIMENTS OF THE INVENTION

The present invention is applicable for use with all types of phase shift keying modulation formats, and any multiple-chip (N-chip) detection intervals. However, for purposes of simplicity, discussions will concentrate mainly on exemplary use of symmetric differential phase shift keying (SDPSK) and symmetric differential quadriphase shift keying (SDQPSK) modulation formats and a 4-chip detection interval, although the scope and implementation of the present invention is not limited thereto.

Figure 1:
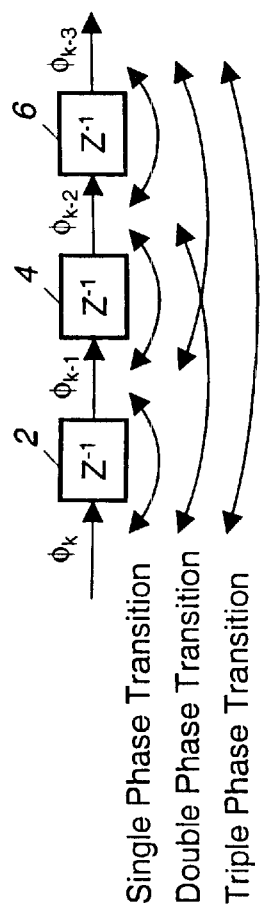
FIG. 1 illustrates phase transitions of a 4-chip detection according to the principles of the present invention.

Attention now is directed to the drawings and particularly to FIG. 1, which illustrates phase transitions of multi-chip detection of a symmetric differential phase shift keying (SDPSK) modulation format according to the principles of the present invention. Data information may be stored in the difference of phases. For example, if a data symbol '0' is to be transmitted over a channel, the SDPSK modulator of a communication transmitter may increase the transmitted phase by 90°. Likewise, if a data symbol '1' is to be transmitted over a channel, the SDPSK modulator may decrease the transmitted phase by 90°. A communication receiver may be used to detect the symbols being sent given the phase transitions.

In a 4-chip detection, for example, the observation interval may be four. For every clock cycle, four consecutive phases of the received information may be captured and processed at the communication receiver for output as three symbols intended to be sent by the communication transmitter. The relationships between the four received phases are shown in FIG. 1. Individual chip delay units may be used to delay an input phase, $\phi_k$ by one-chip. Consequently, the received phase information for each clock cycle may be represented as $\phi_k$ the input phase, $\phi_{k-1}$ the input phase received one cycle earlier, $\phi_{k-2}$ the input phase received two cycles earlier, and $\phi_{k-3}$ the input phase received three cycles earlier.

As shown in FIG. 1, there may be a total of six (6) phase differences among the four received phases: three single phase transitions, two double phase transitions, and one triple phase transition. The three single phase transitions may occur when an input phase may transition from $\phi_k$ to $\phi_{k-1}$, from $\phi_{k-1}$ to $\phi_{k-2}$, and from $\phi_{k-2}$ to $\phi_{k-3}$. Similarly, the two double phase transitions may occur when an input phase may transition from $\phi_k$ to $\phi_{k-2}$ and from $\phi_{k-1}$ to $\phi_{k-3}$. Lastly, the one triple phase transition may occur when an input phase may transition from $\phi_k$ to $\phi_{k-3}$ directly.

Each phase difference may then be coded by a bit according to the following rules:

single phase transition: [0°, 180°)→'0'; [180°, 360°)→'1'.

double phase transitions: [0°, 90°) or [270°, 360°)→'0'; [90°, 270°)→'1'.

triple phase transitions: [0°, 180°)→'0'; [180°, 360°)→'1'.

For the sake of convenience, all negative phase differences have been converted to positive by adding 360°. The encoded 6-bit result may be called received vector, which may be represented by r. The first three bits of the received vector r may be data bits and the last three bits of the received vector r may be parity bits.

As an example, if the incoming phases are $\phi_{k-3}=0°$, $\phi_{k-2}=90°$, $\phi_{k-1}=180°$, and $\phi_k=90°$, then the phase differences may be provided as follows:

$\phi_{k-2}-\phi_{k-3}=[90°-0°=90°]$ which may be coded as '0'), $\phi_{k-1}-\phi_{k-2}=[180°-90°=90°]$ which may be coded as ('0'), $\phi_k-\phi_{k-1}=[90°-180°=270°]$ which may be coded as ('1'), $\phi_k-\phi_{k-2}=[90°-90°=$ ] which may be coded as ('0'), $\phi_{k-1}-\phi{k-3}=[180°-0°=180°]$ which may be coded as ('1'), and $\phi k-\phi_{k-3}=[90°-0°=90°]$ which may be coded as ('0').

Therefore the received vector r based on the six (6) input phase differences among the four received phases $\phi_k$, $\phi_{k-1}$, $\phi_{k-2}$, and $\phi_{k-3}$ as described in this example may be characterized as (0,0,1,0,1,0).

Figure 2:
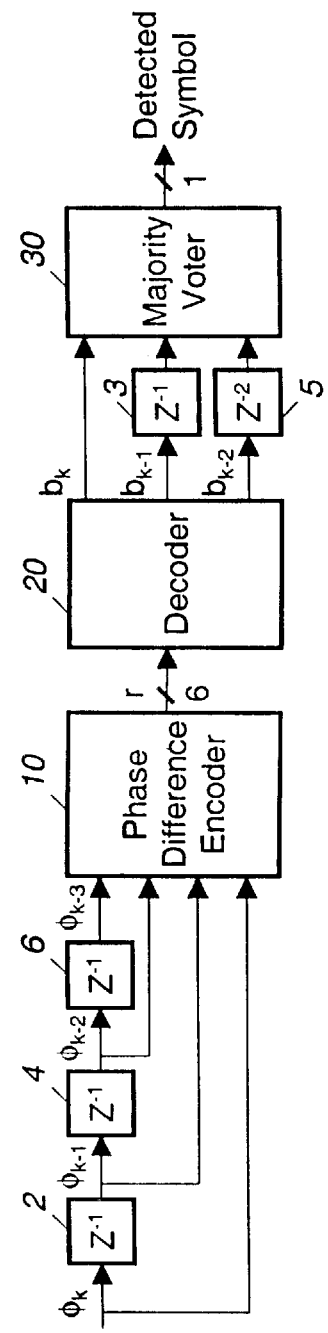
FIG. 2 illustrates a block diagram of a symmetric differential phase shift keying (SDPSK) data detector constructed according to the principles of the present invention.

Turning now to FIG. 2 which illustrates a block level diagram of a data detector for decoding data of a symmetric differential phase shift keying (SDPSK) modulation format constructed according to the principles of the present invention. As shown in FIG. 2, the SDPSK data detector comprises a plurality of chip delay units 2–6, a phase-difference encoder block 10, a decoder block 20, and a majority voter block 30. Individual one-chip delay units 2, 4, 6 as shown in FIG. 1 are used to delay an input phase, $\phi_k$ by one-chip, two-chips and three-chips to ensure that the received phase information for each clock cycle containing four consecutive phases $\phi_k$, $\phi_{k-1}$, $\phi_{k-2}$, and $\phi_{k-3}$ are input to the phase-difference encoder block 10. The phase-difference encoder block 10 may be configured to determine six (6) phase differences among the four received phases $\phi_k$, $\phi_{k-1}$, $\phi_{k-2}$, and $\phi_{k-3}$, and to encode each of the phase differences based on the phase transitions as described with reference to FIG. 1 in order to obtain the encoded 6-bit received vector represented by r. The decoder block 20 may be configured to detect the three consecutive symbols sent by the communication transmitter from the encoded 6-bit received vector by mapping the incoming received vector r with a set of ideal vectors represented by v.

For a duration of three (3) symbols, there may be eight (8) ideal phase transition patterns, which may correspond to eight (8) ideal vectors. In other words, since there are 3 symbols (3 bits) to be decoded in SDPSK modulation format, there may be a total of $2^3$ or eight (8) ideal vectors, v available for producing the 3-bit decisions $b_{k-2}$, $b_{k-1}$, $b_k$. The decoder block 20 may map the incoming vector r to the corresponding ideal vector v that has the least distance with r in order to produce the 3-bit decisions $b_{k-2}$, $b_{k-1}$, $b_k$. The parallel 3-bit decisions $b_{k-2}$, $b_{k-1}$, $b_k$ may be held for three chips and then output sequentially; during the first chip, $b_k$, during the second chip, $b_{k-1}$, and during the third chip, $b_{k-2}$. Chip delay units 3 and 5 are used to ensure that all three decisions of the same symbol are simultaneously input to the majority voter block 30. The majority voter block 30 is used to choose the bit estimate that occurs the most, or 2 times out of 3 symbols, as a final bit decision during the chip interval by way of a "majority rule."

Figures 3, 4:
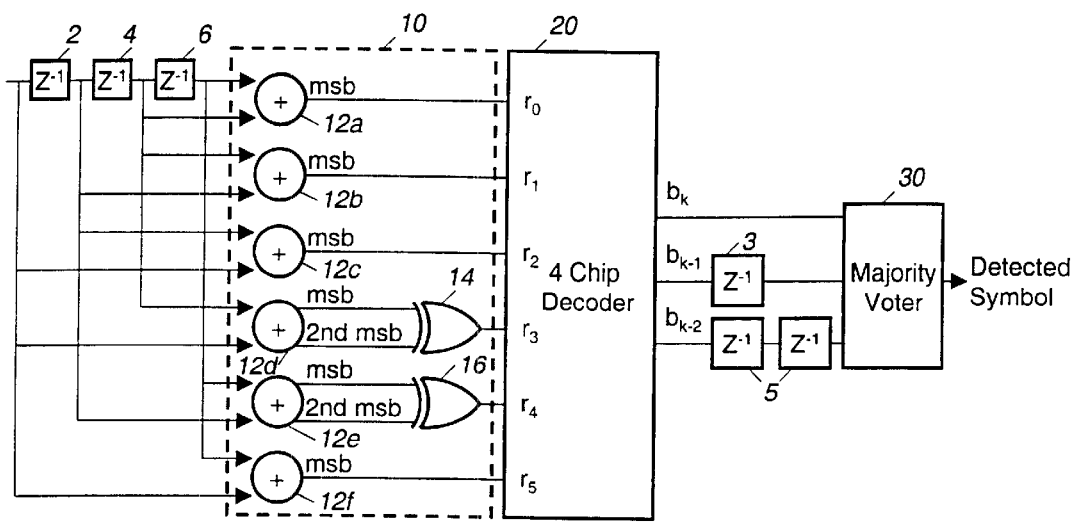
FIG. 3 illustrates an implementation example of a phase difference encoder block of the symmetric differential phase shift keying (SDPSK) data detector according to the principles of the present invention.
FIG. 4 illustrates mapping instructions of ideal vectors and corresponding 3-bit decisions of a symmetric differential phase shift keying (SDPSK) data detector according to the principles of the present invention.

An implementation example of the data detector for decoding data of a symmetric differential phase shift keying (SDPSK) modulation format according to the principles of the present invention may be illustrated in FIG. 3. As shown in FIG. 3, the phase-difference encoder block 10 comprises a plurality of adders (subtractor) 12a, 12b, 12c, 12d, 12e, 12f and XOR gates 14, 16 used to produce an incoming received vector represented by r. The decoder block 20 may be a 4-chip decoder implemented using a simple 64×3 read-only-memory (ROM). The majority voter block 30 may contain a 3-to-1 output logic circuit for making a final decision using a "majority rule" to produce a result bit decision. For example, input 3-bit decisions (1,0,1) may result in a final bit decision of "1".

Specifically, the first adder 12a of the phase-difference encoder block 10 is used to determine the phase difference of an input phase delayed by two-chips and an input phase delayed by three-chips, $\phi_{k-2}-\phi_{k-3}$. An encoded bit corresponding to the phase difference, $\phi_{k-2}-\phi_{k-3}$ may be provided in terms of its most significant bit "MSB" to the 4-chip decoder 20. Similarly, the second adder 12b is used to determine the phase difference of an input phase delayed by one-chip and an input phase delayed by two-chips, $\phi_{k-1}-\phi_{k-2}$. An encoded bit corresponding to the phase difference $\phi_{k-1}-\phi_{k-2}$ may be provided in terms of its most significant bit "MSB" to the 4-chip decoder 20. The third adder 12c is used to determine the phase difference of an input phase and an input phase delayed by one-chip, $\phi_k-\phi_{k-1}$ An encoded bit corresponding to the phase difference, $\phi_k-\phi_{k-1}$, may be provided in terms of its most significant bit "MSB" to the 4-chip decoder 20. The fourth adder 12d is used to determine the phase difference of an input phase and an input phase delayed by two-chips, $\phi_k-\phi_{k-2}$. A first XOR gate 14 may be used to combine a first most significant bit "MSB" and a second most significant bit "$2^{nd}$ MSB" and to provide an encoded bit corresponding to the phase difference, $\phi_k-\phi_{k-2}$, to the 4-chip decoder 20. The fifth adder 12e is used to determine the phase difference of an input phase delayed by one-chip and an input phase delayed by two-chips, $\phi_{k-1}-\phi_{k3}$. A second XOR gate 16 may be used to combine a first most significant bit "MSB" and a second most significant bit "$2^{nd}$ MSB" and to provide an encoded bit corresponding to the phase difference, $\phi_{k-1}-\phi_{k-3}$, to the 4-chip decoder 20. The sixth adder 12f is used to determine the phase difference of an input phase and an input phase delayed by two-chips, $\phi_k-\phi_{k-3}$. An encoded bit corresponding to the phase difference, $\phi_k-\phi_{k-3}$, may be provided to the 4-chip decoder 20. All encoded bits provided to the 4-chip decoder 20 may be characterized as an encoded 6-bit received vector represented by r ($r_0$, $r_1$, $r_2$, $r_3$, $r_4$, $r_5$).

The 4-chip decoder 20 may contain a set of ideal vectors v. The ideal vectors v contain all phase transition possibilities over the 4-chip detection interval in a noiseless environment. Also included in the 4-chip decoder 20 may be a mapping instruction of the ideal vectors v and the 3-bit decisions $b_{k-2}$, $b_{k-1}$, $b_k$ as follows:

| v | $b_{k-2}$, $b_{k-1}$, $b_{k-3}$ |
|---|---|
| (0,0,0,1,1,1) | (0,0,0) |
| (0,0,1,0,1,0) | (0,0,1) |
| (0,1,0,0,0,0) | (0,1,0) |
| (0,1,1,1,0,1) | (0,1,1) |
| (1,0,0,1,0,0) | (1,0,0) |
| (1,0,1,0,0,1) | (1,0,1) |
| (1,1,0,0,1,1) | (1,1,0) |
| (1,1,1,1,1,0) | (1,1,1) |

For a duration of three (3) consecutive symbols, there may be eight (8) ideal vectors. These eight (8) ideal vectors are illustrated in FIG. 4. If the incoming vector r contains noise, the 4-chip decoder 20 may map the incoming vector r to the corresponding ideal vector v that has the least distance with r. When the ideal vector v is found, the 4-chip decoder 20 may output in parallel the 3-bit decisions $b_{k-2}$, $b_{k-1}$, $b_k$ in accordance with a one-to-one mapping instruction from the ideal vectors. For example, if a corresponding ideal or of "0,0,1,0,1,0" is found as shown in FIG. 4, the parallel 3-bit decisions $b_{k-2}$, $b_{k-1}$, $b_k$ of "0,0,1" may be produced. Similarly, if a corresponding ideal vector of "1,0,1,0,0,1" is found, the parallel 3-bit decisions $b_{k-2}$, $b_{k-1}$, $b_k$ of "1,0,1" may be produced.

Each symbol $b_{k-2}$, $b_{k-1}$, $b_k$ may be detected three (3) times. Therefore a majority voter block 30 is used to do a final detection. The majority voter block 30 may output a bit that has appeared at least twice in its input. For example, input 3-bit decisions "1,0,1" may result a final detection of '1'. The majority voter processing scheme may advantageously provide significant performance gains with little impact on hardware complexity. As a result, the majority voter processing scheme may be seen as a 7-chip detection performance when compared with the performance of the 4-chip detection technique where there is no majority voter. A 7-chip detection performance may be seen because each symbol $b_{k-2}$, $b_{k-1}$, $b_k$ are detected three (3) times by the major voter block 30.

A complete example of the data detection algorithm described may be summarized as shown in TABLE 1 as follows:

The first three columns represent the transmitter data: s, $\Delta\theta$, and $\theta$ denote transmitted symbol, transmitted phase difference, and transmitted phase, respectively. The rest of the columns contain the detector data: $\phi$, $\Delta\phi$, r, v, b, and $s_d$ represent the received phase, received phase difference, received vector, ideal vector, decoder output, and detected symbol output, respectively.

It is noted that the received phases $\phi$ may be noisy, and the third received vector r of "0,1,1,1,0,0" may not correspond to the set of the ideal vectors, the mapping ideal vector v may be "0,1,1,1,0,1". One important fact may be that since the first two and the last two symbols are detected less than three times, the majority voter block 30 may not be needed. But when the majority voter block 30 is used, the first decoder output bit may go straight to the majority voter block 30 while the second and the third symbols may pass through one-chip delay unit 3 and two-chip delay unit 5, respectively. At t=2, the third symbol has been detected three times (see the three zeros in the t=2 column), so the majority voter block 30 may output a '0.' Therefore the third entry of the $s_d$ column may be '0'. It is also noted that even when the input phases to the SDPSK data detector as shown in FIG. 3 have been corrupted, the symbols output by the SDPSK data detector according to the present invention may be identical to the symbols intended to be sent by the communication transmitter.

Figure 5:
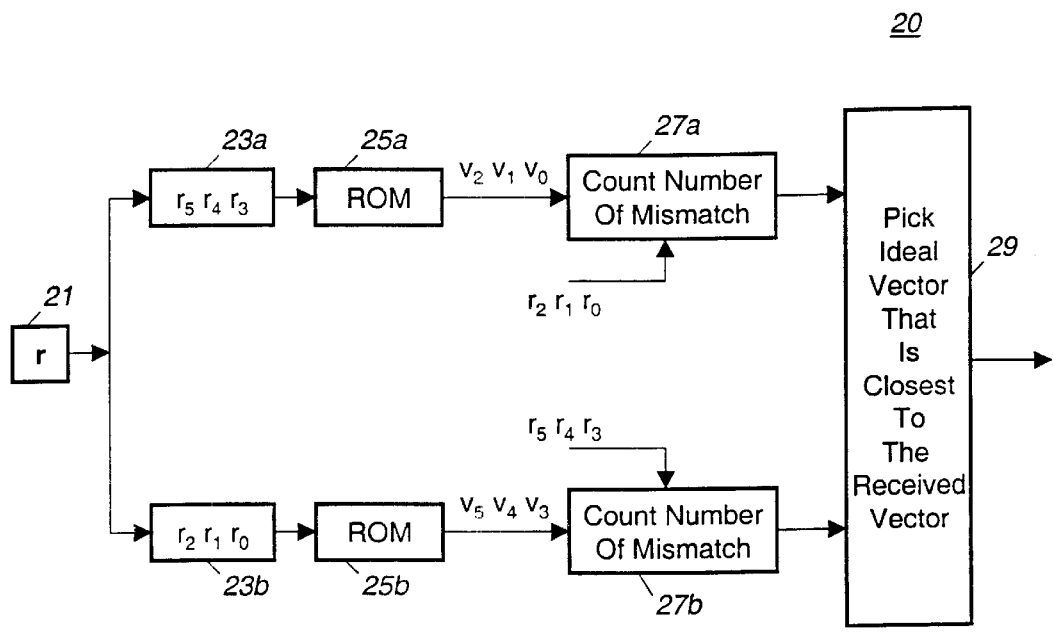
FIG. 5 illustrates an implementation example of a decoder block of the symmetric differential phase shift (SDPSK) data detector according to the principles of the present invention.

FIG. 5 illustrates an implementation example of a decoder block 20 of the SDPSK data detector using the newly developed algorithm according to the principles of the present invention. The decoder block 20 of the SDPSK data detector comprises a vector unit 21, selection units 23a and 23b, read-only-memory (ROM) look-up tables 25a and 25b, mismatch counters 27a and 27b and a comparator 29. The vector unit 21 may receive the incoming vector r=[$r_5$, $r_4$, $r_3$, $r_2$, $r_1$, $r_0$] from the phase-difference encoder 10 for decoding operation. The first selection unit 23a may receive the data bits of the received vector ($r_5$, $r_4$, $r_3$) such that the ROM 25a may provide the parity bits of the ideal vector having the same data bit ($v_2$, $v_1$, $v_0$) and the mismatch counter 27a may determine or count the number of mismatches between the ROM output and the parity bits of the received vector. Likewise, the second selection unit 23b may receive the parity bits of the received vector ($r_2$, $r_1$, $r_0$) such that the ROM 25b may provide the data bits of the ideal vector having the same parity bits ($v_5$, $v_4$, $v_3$) and the mismatch counter 27b may determine or count the number of mismatches between the ROM output and the data bits of the received vector. The comparator 29 may then be used to pick the ideal vector v that is closest to the received vector r in order to produce the parallel 3-bit decisions $b_{k-2}$, $b_{k-1}$, $b_k$.

| s | $\Delta\theta$ | $\theta$ | $\phi$ | $\Delta\phi$ | r | v | b | | | | | | | | $s_d$ |
|---|---|---|---|---|---|---|---|---|---|---|---|---|---|---|---|
| | | 0° | 0° | | | | t=0 | t=1 | t=2 | t=3 | t=4 | t=5 | t=6 | t=7 | |
| 0 | +90° | 90° | 90° | +90° | | | | | | | | | | | |
| 0 | +90° | 180° | 180° | +90° | | | | | | | | | | | |
| 0 | +90° | 270° | 315° | +135° | 000111 | 000111 | 0 | 0 | 0 | | | | | | 0 |
| 1 | −90° | 180° | 265° | −50° | 001010 | 001010 | | 0 | 0 | 1 | | | | | 0 |
| 1 | −90° | 90° | 220° | −45° | 011100 | 011101 | | | 0 | 1 | 1 | | | | 0 |
| 0 | +90° | 180° | 310° | +90° | 110011 | 110011 | | | | 1 | 1 | 0 | | | 1 |
| 1 | −90° | 90° | 220° | −90° | 101001 | 101001 | | | | | 1 | 0 | 1 | | 1 |
| 0 | +90° | 180° | 310° | +90° | 010000 | 010000 | | | | | | 0 | 1 | 0 | 0 |
| | | | | | | | | | | | | | | | 1 |
| | | | | | | | | | | | | | | | 0 |

Figure 6:
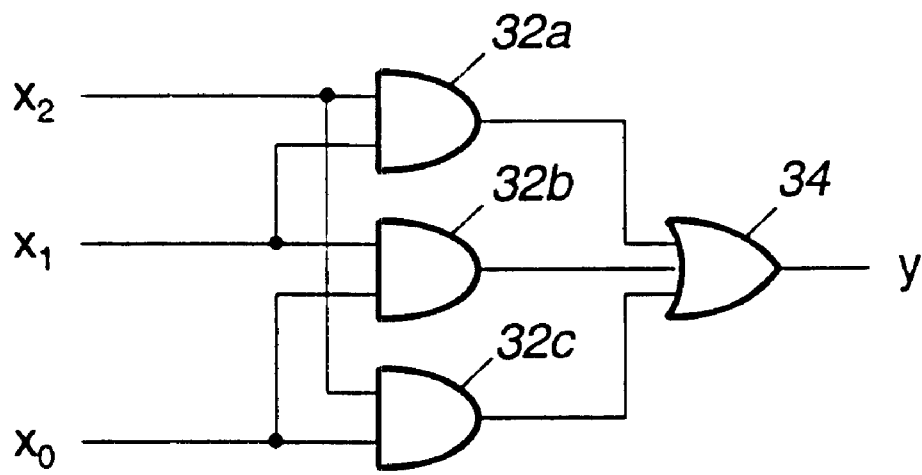
FIG. 6 illustrates an implementation example of a majority voter block of the symmetric differential phase shift (SDPSK) data detector according to the principles of the present invention.

FIG. 6 illustrates an implementation example of a majority voter block 30 of the SDPSK data detector according to the principles of the present invention. The majority voter block 30 may be constructed of a plurality of AND gates 32a, 32b, 32c and a single OR gate 34 for making a "majority vote" between the parallel 3-bit decisions $b_{k-2}$, $b_{k-1}$, $b_k$ represented in terms of $x_0$, $x_1$, and $x_2$. A final decision output of the majority voter block 30 may be expressed in term of "y." Then "y" may be determined using the following logic equation:

$$y = x_2 x_1 + x_2 x_0 + x_1 x_0.$$

Figure 7:
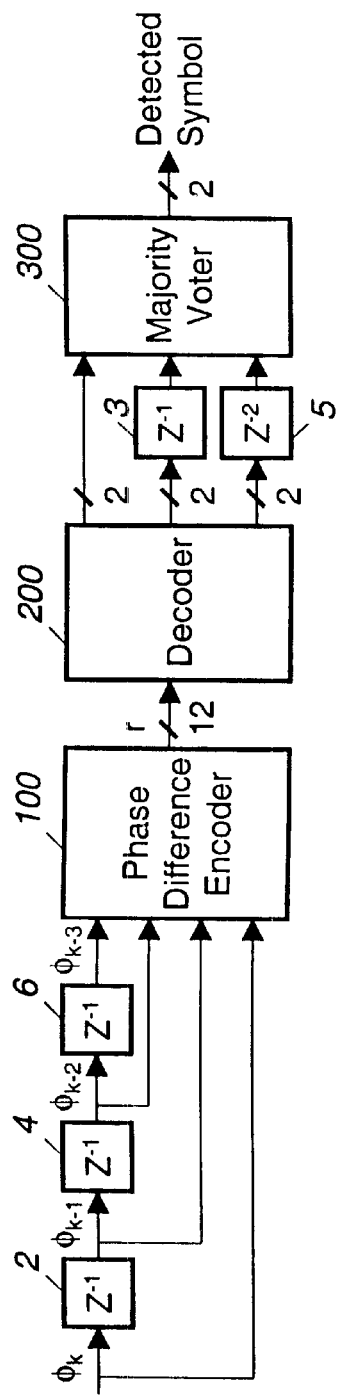
FIG. 7 illustrates a block diagram of a symmetric differential quadriphase shift keying (SDQPSK) data detector constructed according to the principles of the present invention.

Turning now to FIG. 7, a block level diagram of a data detector for decoding data of a symmetric differential quadriphase shift keying (SDQPSK) modulation format constructed A according to the principles of the present invention is illustrated. The 4-chip symmetric differential quadriphase shift keying (SDQPSK) detection may use similar algorithm as the symmetric differential phase shift keying (SDPSK) detection. However, the SDQPSK modulation format is different from the SDPSK modulation format in terms of a number of bits per symbol sent. In SDQPSK modulation format, there may be two-bits per symbol sent as opposed to one-bit per symbol of the SDPSK modulation format. For example, if a data symbol '00' is to be transmitted over a channel, the SDQPSK modulator of a communication transmitter may increase the transmitted phase by 45°. If a data symbol '01' is to be transmitted over a channel, the SDQPSK modulator may decrease the transmitted phase by 45°. If a data symbol "10" is to be transmitted over a channel, the SPQPSK modulator may increase the transmitted phase by 135°. Likewise, if a data symbol '11' is to be transmitted over a channel, the SDQPSK modulator may decrease the transmitted phase by 135°. A communication receiver may be used to detect the symbols being sent given the phase transitions.

In a 4-chip detection, for example, the four consecutive phases of the received information may be captured and processed at the communication receiver for output as three symbols intended to be sent by the communication transmitter. Again, the relationships between the four received phases may be similar to that shown in FIG. 1. Individual chip delay units may be used to delay an input phase, $\phi_k$ by 1 chip. Consequently, the received phase information for each clock cycle may be represented as $\phi_k$ the input phase, $\phi_{k-1}$ the input phase delayed by one-chip, $\phi_{k-2}$ the input phase delayed by two-chips, and $\phi_{k-3}$ the input phase delayed by three-chips.

Similarly, there may be a total of six (6) phase differences among the four received phases: three single phase transitions, two double phase transitions, and one triple phase transition. The three single phase transitions occur when an input phase transitions from $\phi_k$ to $\phi_{k-1}$, from $\phi_{k-1}$ to $\phi_{k-2}$, and from $\phi_{k-2}$ to $\phi_{k-3}$. The two double phase transitions occur when an input phase transitions from $\phi_k$ to $\phi_{k-2}$ and from $\phi_{k-1}$ to $\phi_{k-3}$. Lastly, the one triple phase transition occurs when an input phase transitions from $\phi_k$ to $\phi_{k-3}$ directly.

The received vector, r, may be a 12-bit vector since each phase difference may be represented by two bits. Each phase difference may then be coded by a bit according to the following rules:

single phase transition: [0°, 90°)→'00'; [90°, 180°)→'10'. [180°, 270°)→'11'; [270°, 360°)→'01' double phase transitions: [0°, 45°) or [315°, 360°)→'00'; [45°, 135°)→'10'. [135°, 225°)→'11'; [225°, 315°)→'01' triple phase transitions: [0°, 90°)→'00'; [90°, 180°)→'10'. [180°, 270°)→'11'; [270°, 360°)→'01'.

The six most significant bits (MSB) of a received vector, r, may constitute data bits while the six least significant bits (LSB) of received vector r may constitute parity bits. Since there are 3 symbols (6 bits) to be decoded in SDQPSK modulation format, there may be a total of $2^6$ or 64 ideal vectors, v, as opposed to the 8 ideal vectors required for SDPSK modulation format.

As shown in FIG. 7, the SDQPSK data detector comprises a plurality of chip delay units 2–6, a phase-difference encoder block 100, a decoder block 200, and a majority voter block 300. Individual one-chip delay units 2, 4, 6 are used to delay an input phase, $\phi_k$ by 1 chip, 2 chips and 3 chips to ensure that the received phase information for each clock cycle containing four consecutive phases $\phi_k$, $\phi_{k-1}$, $\phi_{k-2}$, and $\phi_{k-3}$ are input to the phase-difference encoder block 100. The phase-difference encoder block 100 may be configured to determine six phase differences and to encode the received vector r. The closet ideal vector v may be found by comparing the given received vector r to each of the 64 ideal vectors, then choosing the one with the least mismatches. The decoder block 200 may map the incoming vector r to each of the 64 ideal vectors v, and then choose the one with the least mismatches. If there is equal number of mismatches, the following tie breaker rules may be used: first, pick the ideal vector v with the least data bits mismatch with the received vector, r. Second, if there are equal number of data bits mismatches among different detection choices, pick the ideal vector that has mismatch closer to the most significant bit (MSB) with respect to the received vector, r.

For example, if a received vector r is "00,00,00,00,11,01," the closest ideal vectors may be at distance 3, and the detection choices may be as follows:

$v_0$="100000101111" and $v_1$="000001001000."

In this example, the first rule may not apply since both ideal vectors have same number of data bits mismatch. According to the second rule, since $v_0$ has mismatch at the first MSB while $v_1$ has mismatch at the sixth MSB, $v_0$ may be chosen as the detected vector. When the ideal vector is found, the first 6 MSBs of the ideal vector may be the decoder output. Similarly to the SDPSK detection, each symbol may be detected tree (3) times (except the first and the last two symbols). The majority voter block 300 may then be used to vote on both the MSB and the LSB of the 3 detected symbol choices during the chip interval. A set of 64 ideal vectors v which contain all phase transition possibilities over the 4-symbol SDQPSK detection interval in a noiseless environment may be provided as follows:

| Symbols Group | Ideal Vectors |
| --- | --- |
| 0 | (000000101010) |
| 1 | (000001001000) |
| 2 | (000010111011) |
| 3 | (000011011001) |
| 4 | (000100000000) |
| 5 | (000101010001) |
| 6 | (000110100010) |
| 7 | (000111110011) |
| 8 | (001000111111) |
| 9 | (001001101110) |
| 10 | (001010011101) |
| 11 | (001011001100) |
| 12 | (001100010101) |
| 13 | (001101110111) |

-continued

| Symbols Group | Ideal Vectors |
| --- | --- |
| 14 | (001110000100) |
| 15 | (001111100110) |
| 16 | (010000100000) |
| 17 | (010001000001) |
| 18 | (010010110010) |
| 19 | (010011010011) |
| 20 | (010100000101) |
| 21 | (010101010111) |
| 22 | (010110100100) |
| 23 | (010111110110) |
| 24 | (011000111010) |
| 25 | (011001101000) |
| 26 | (011010011011) |
| 27 | (011011001001) |
| 28 | (011100011111) |
| 29 | (011101111110) |
| 30 | (011110001101) |
| 31 | (011111101100) |
| 32 | (100000101111) |
| 33 | (100001001110) |
| 34 | (100010111101) |
| 35 | (100011011100) |
| 36 | (100100001010) |
| 37 | (100101011000) |
| 38 | (100110101011) |
| 39 | (100111111001) |
| 40 | (101000110101) |
| 41 | (101001100111) |
| 42 | (101010010100) |
| 43 | (101011000110) |
| 44 | (101100010000) |
| 45 | (101101110001) |
| 46 | (101110000010) |
| 47 | (101111100011) |
| 48 | (110000100101) |
| 49 | (110001000111) |
| 50 | (110010110100) |
| 51 | (110011010110) |
| 52 | (110100001111) |
| 53 | (110101011110) |
| 54 | (110110101101) |
| 55 | (110111111100) |
| 56 | (111000110000) |
| 57 | (111001100001) |
| 58 | (111010010010) |
| 59 | (111011000011) |
| 60 | (111100011010) |
| 61 | (111101111000) |
| 62 | (111110001011) |
| 63 | (111111101001) |

Figure 8:
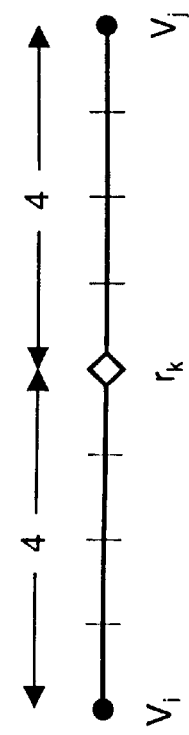
FIG. 8 illustrates a positional relationship between a received vector and closest ideal vectors of the symmetric differential quadriphase shift keying (SDQPSK) data detector according to the principles of the present invention.

The decoder block 200 may be implemented with an efficient hardware architecture given the properties of the received vector r and the ideal vector v, and the relationship between the two. There is always a unique mapping from the data bits to the parity bits since the data bits or parity bits may identify the ideal vector. Next, by comparing all 64 ideal vectors one-by-one, the shortest and longest distance between any two ideal vectors may be found. For example, the shortest distance between any two ideal vectors may be three (3), and the longest may be eight (8), $$3 \leq d(v_i, v_j) \leq 8, i, j=0, \ldots 63,$$

where $d(v_i, v_j)$ refers to the distance between the two vectors, or the number of positions in which they differ. It is noted that the decoder block 200 may correct from one up to four errors if the detection is made correctly. The worse case may be when the received vector is at the midpoint of two ideal vectors whose distance is 8 as illustrated in FIG. 8.

Thus if a random received vector, $r_k$, is received, and, $$d(r_k, v_i) \leq 4,$$

where $v_i$ is closest ideal vector to $r_k$.

First, examine the case of $d(r_k, V_i)=4$ where the input data has been heavily corrupted. In this case, $r_k$ has more than one detection choice which all may have distance of 4 from the received vector. According to the tie breaker rule described previously, the ideal vector that has exactly the same data bits compared to the received vector may be chosen. Therefore if the received vector has 4 errors, detection may be made such that the received vector has no data bits error and 4 parity bits errors.

As an example, if r=000000010110, detection choices may be derived from the 64 ideal vectors listed as follows:

000000101010 (r has 0 data error, 4 parity errors),
001000111111 (r has 1 data error, 3 parity errors),
100001001110 (r has 2 data errors, 2 parity errors),
101010010100 (r has 3 data errors, 1 parity error), and
110011010110 (r has 4 data errors, 0 parity error).

The first ideal vector "000000101010" may be chosen over the others.

Now for the cases of $d(r_k, v_i) \leq 3$, the number of data bits errors and parity bits errors the received vector may be listed as follows.

| Data bit error | Parity bit error |
| --- | --- |
| $d(r_k, v_i) = 3$: | |
| 3 | 0 |
| 2 | 1 |
| 1 | 2 |
| 0 | 3 |
| $d(r_k, v_i) = 2$: | |
| 2 | 0 |
| 1 | 1 |
| 0 | 2 |
| $d(r_k, v_i) = 1$: | |
| 1 | 0 |
| 0 | 1 |
| $d(r_k, v_i) = 0$: | |
| 0 | 0 |

And let's restate the case of

| $d(r_k, v_i) = 4$: | |
| --- | --- |
| Data bit error | Parity bit error |
| 0 | 4 | to be complete. Now define D to be the difference vector between $r_k$ and $v_i$, $$D = r_k - v_i,$$

where '−' may denote bit-by-bit modulo-2 subtraction, and that $v_i$ may be the closest ideal vector to $r_k$. The difference vector D between $r_k$ and $v_i$ may further be defined as follows:

$$D = [a\ b],$$

where a and b are both 6-bit vectors. In this case, a may represent the data bit error vector and b may represent the parity bit error vector. If the weighting operator w(a) denotes the number of ones in the argument vector, then w(a), or weight of a, may indicate the number of data bits errors $r_k$ has. Likewise, w(b) may show number of parity bits errors. Recall the results listed in the five tables above, the most important property for SDQPSK modulation format may be derived as follows:

if $r_k$ is detected to $v_i$ and $r_k - v_i = [a\ b]$,
then min $\{w(a), w(b)\} = \{0,1\}$.

The property may state that given a random $r_k$, the detected vector may have either the same data bits, or the same parity bits, or be only 1-bit off in data bits, or be only 1-bit off in parity bits compared to the received vector. To further clarify the property, assuming that a received vector, $r = [r_{11}\ r_{10}\ r_9\ r_8\ r_7\ r_6\ r_5\ r_4\ r_3\ r_2\ r_1\ r_0]$, then according to the proper may be at most 14 detection choices, namely:

$v_0 = [r_{11}\ r_{10}\ r_9\ r_8\ r_7\ r_6\ v_{0,5}\ v_{0,4}\ v_{0,3}\ v_{0,2}\ v_{0,1}\ v_{0,0}]$
$v_1 = [r_{11}\ vr_{10}\ r_9\ r_8\ r_7\ r_6\ v_{1,5}\ v_{1,4}\ v_{1,3}\ v_{1,2}\ v_{1,1}\ v_{1,0}]$
$v_2 = [r_{11}\ r_{10'}r_9\ r_8\ r_7\ r_6\ v_{2,5}\ v_{2,4}\ v_{2,3}\ v_{2,2}\ v_{2,1}\ v_{2,0}]$
$v_3 = [r_{11}\ r_{10}\ r_{9'}r_8\ r_7\ r_6\ v_{3,5}\ v_{3,4}\ v_{3,3}\ v_{3,2}\ v_{3,1}\ v_{3,0}]$
$v_4 = [r_{11}\ r_{10}\ r_9\ r_{8'}r_7\ r_6\ v_{4,5}\ v_{4,4}\ v_{4,3}\ v_{4,2}\ v_{4,1}\ v_{4,0}]$
$v_5 = [r_{11}\ r_{10}\ r_9\ r_8\ r_{7'}r_6\ v_{5,5}\ v_{5,4}\ v_{5,3}\ v_{5,2}\ v_{5,1}\ v_{5,0}]$
$v_6 = [r_{11}\ r_{10}\ r_9\ r_8\ r_7\ r_{6'}v_{6,5}\ v_{6,4}\ v_{6,3}\ v_{6,2}\ v_{6,1}\ v_{6,0}]$
$v_7 = [v_{7,11}\ v_{7,10}\ v_{7,9}\ v_{7,8}\ v_{7,7}\ v_{7,6}\ r_5\ r_4\ r_3\ r_2\ r_1 r_0]$
$v_8 = [v_{8,11}\ v_{8,10}\ v_{8,9}\ v_{8,8}\ v_{8,7}\ v_{8,6}\ r_{5'}r_4\ r_3\ r_2\ r_1\ r_0]$
$v_9 = [v_{9,11}\ v_{9,10}\ v_{9,9}\ v_{9,8}\ v_{9,7}\ v_{9,6}\ r_5\ r_{4'}r_3\ r_2\ r_1\ r_0]$
$v_{10} = [v_{10,11}\ v_{10,10}\ v_{10,9}\ v_{10,8}\ v_{10,7}\ v_{10,6}\ r_5\ r_4\ r_{3'}r_2\ r_1\ r_0]$
$v_{11} = [v_{11,11}\ v_{11,10}\ v_{11,9}\ v_{11,8}\ v_{11,7}\ v_{12,6}\ r_5\ r_4\ r_3\ r_{2'}r_1\ r_0]$
$v_{12} = [v_{12,11}\ v_{12,10}\ v_{12,9}\ v_{12,8}\ v_{12,7}\ v_{12,6}\ r_5\ r_4\ r_3\ r_2\ r_{1'}r_0]$
$v_{13} = [v_{13,11}\ v_{13,10}\ v_{13,9}\ v_{13,8}\ v_{13,7}\ v_{13,6}\ r_5\ r_4\ r_3\ r_2\ r_1\ r_{0'}]$ where $r_{11}'$ may denote the complement of $r_{11}$, and $v_{0,5}$ may denote the 5th component of $v_0$.

For example, $v_0$ has the same data bits as r, where $v_9$ has the same parity bits as r except the 4th component. Note that since the data bits and parity bits of a ideal vector always have one-to-one mapping, one can be found by knowing the other. This can be done by using a lookup table such as a read-only-memory (ROM). As an example, parity bits of the ideal vector $v_0$ may be found given the data bits. The parity bits of the ideal vector $v_0$ may then be compared with the parity bits of the received vector r. Out of the 14 ideal vectors v, the one with the least distance to the received vector r may become the detection choice, and the tie breaker rule may be used whenever applicable.

Figure 9:
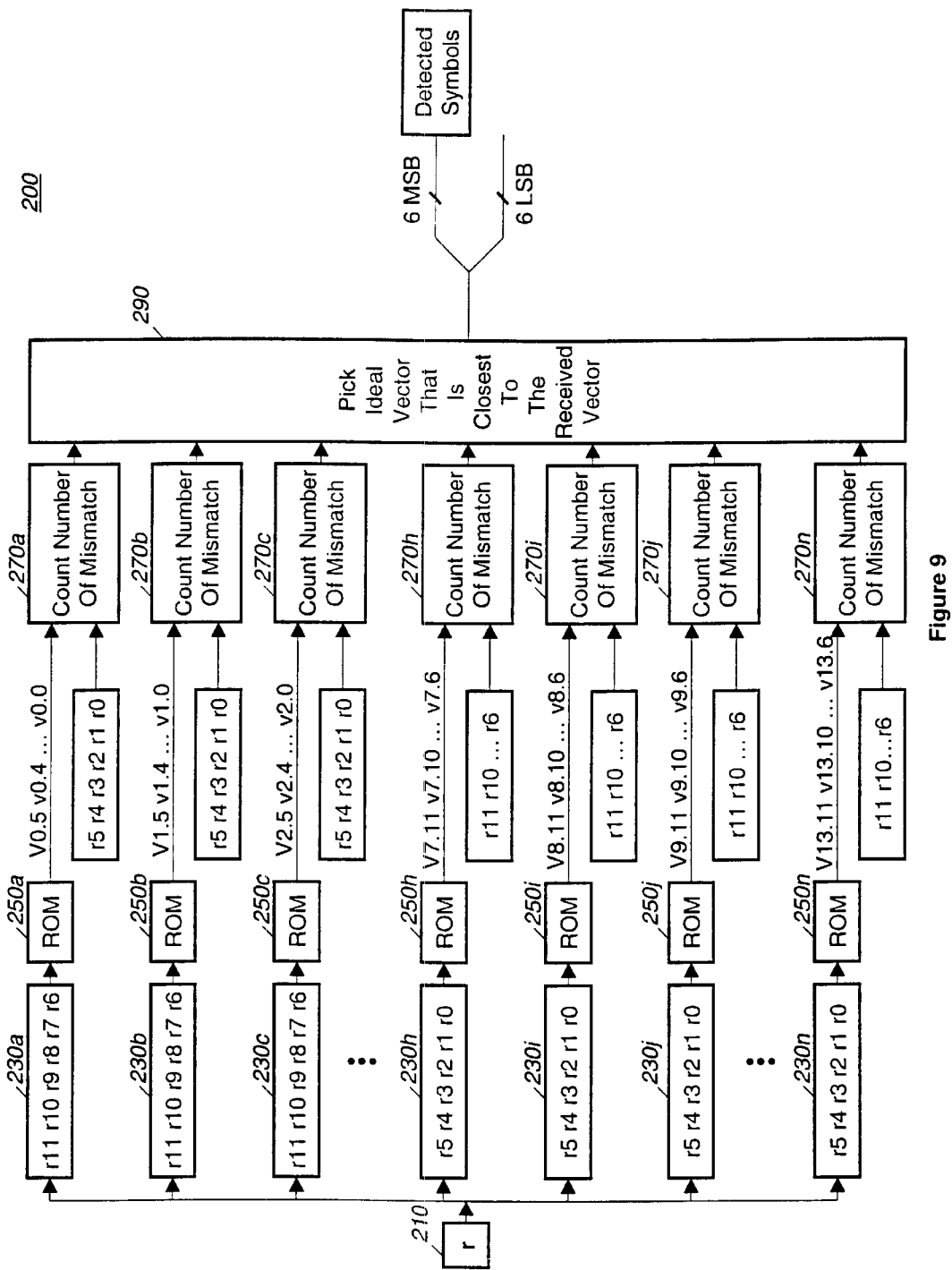
FIG. 9 illustrates an implementation example of a decoder block of the symmetric differential quadriphase shift keying (SDQPSK) data detector according to the principles of the present invention.

FIG. 9 illustrates an implementation example of a decoder block 200 of the SDQPSK data detector using the newly developed algorithm according to the principles of the present invention. The decoder block 200 comprises a vector unit 210, a plurality of selection units 230a–230n, a plurality of look-up tables 250a–250n, a plurality of mismatch counters 270a–270n and a comparator 290. The vector unit 210 may receive the incoming vector r $[r_{11}\ r_{10}\ r_9\ r_8\ r_7\ r_6\ r_5\ r_4\ r_3\ r_2\ r_1\ r_0]$ from the phase-difference encoder 100 for decoding operation. Since at most 14 ideal vectors as described above may be used for making the detection choices, there may be 14 selection units, 14 ROM look-up tables, 14 mismatch counters, one comparator and one 14-to-1 multiplexer required for the decoder block 200. The top 7 ROM look-up tables may be identical where the parity bit of the ideal vectors are to be found. Likewise, the bottom 7 ROM look-up tables may be identical where the data bits are to be found.

As shown in FIG. 9, the first selection unit 230a is used to receive the top 6-bits (data bits) of the received vector r $[r_{11}\ r_{10}\ r_9\ r_8\ r_7\ r_6]$. The first ROM look-up table 250a may be used to provide the parity bits of the ideal vector having the same data bits $[v_{0,5}\ v_{0,4}\ v_{0,3}\ v_{0,2}\ v_{0,1}\ v_{0,0}]$ such that the mismatch counter 270a may determine or count the number of mismatches with the bottom 6-bits of the received vector r $[r_5\ r_4\ r_3\ r_2\ r_1\ r_0]$. Similarly, the second selection unit 230b is used to receive the data bits of the received vector with $r_{11}$ inverted $[r_{11'}r_{10}\ r_9\ r_8\ r_7\ r_6]$. The second ROM look-up table 250b may be used to provide the parity bits of the corresponding ideal vector $[v_{1,5}\ v_{1,4}\ v_{1,3}\ v_{1,2}\ v_{1,1}\ v_{1,0}]$ such that the mismatch counter 270b may determine or count the number of mismatches with the bottom 6-bits of the received vector r $[r_5\ r_4\ r_3\ r_2\ r_1\ r_0]$. Similarly, the third to seventh selection units 230c–230g are used to receive the data bits of the receive vector with the appropriate bit inverted $[r_{11}\ r_{10}\ r_9\ r_8\ r_7\ r_6]$, $[r_{11}\ r_{10}\ r_9'r_8\ r_7\ r_6]$ ... $[r_{11}\ r_{10}\ r_9\ r_8\ r_7\ r_{6'}]$. The third to seven ROM look-up tables 250c–250g may be used to provide the parity bits of the corresponding ideal vector $[v_{2,5}\ v_{2,4}v_{2,3}\ v_{2,2}\ v_{2,1}\ v_{2,0}]$ ... $[v_{7,11}\ v_{7,10}\ v_{7,9}\ v_{7,8}\ v_{7,7}\ v_{7,6}]$ such that the mismatch counters 270c–270g may determine the number of mismatches with the same bottom 6-bits of the received vector r $[r_5\ r_4\ r_3\ r_2\ r_1\ r_0]$.

Likewise, the eighth selection unit 230h is used to receive the bottom 6-bits (parity bits) of the received vector r $[r_5\ r_4\ r_3\ r_2\ r_1\ r_0]$. The eighth ROM look-up table 250h may be used to provide the data bits of the ideal vector having the same parity bits $[v_{7,11}\ v_{7,10}\ v_{7,9}\ v_{7,8}\ v_{7,7}\ v_{7,6}]$ such that the mismatch counter 270h may determine or count the number of mismatches with the top 6-bits of the received vector r $[r_{11}\ r_{10}\ r_9\ r_8\ r_7\ r_6]$. The ninth selection unit 230i is used to receive the parity bits of the received vector with $r_5$ inverted $[r_{5'}r_4\ r_3\ r_2\ r_1\ r_0]$. The ninth ROM look-up table 250i may be used to provide the data bits of the corresponding ideal vector $[v_{8,11}\ v_{8,10}\ v_{8,9}\ v_{8,8}\ v_{8,7}\ v_{8,6}]$ such that the mismatch counter 270i may determine or count the number of mismatches with the top 6-bits of the received vector r $[r_{11}\ r_{10}\ r_9\ r_8\ r_7\ r_6]$. Similarly, the tenth to fourteenth selection unit 230j–230n are used to receive the parity bits of the received vector with the appropriate bit inverted $[r_5\ r_{4'}r_3\ r_2\ r_1\ r_0]$ to $[r_5\ r_4\ r_3\ r_2\ r_1\ r_{0'}]$. The tenth to fourteenth ROM look-up tables 250j–250n may be used to provide the data bits of the corresponding ideal vector $[v_{10,11}\ v_{10,10}\ v_{10,9}\ v_{10,8}\ v_{10,7}\ v_{10,6}]$ ... $[v_{13,11}\ v_{13,10}\ v_{13,9}\ v_{13,8}\ v_{13,7}\ v_{13,6}]$ such that the mismatch counters 270j–270n may determine the number of mismatches with the same top 6-bits of the received vector r $[r_{11}\ r_{10}\ r_9\ r_8\ r_7\ r_6]$.

The comparator 290 may then be used to pick the ideal vector v that is closest to the received vector r in order to produce the parallel detected symbols.

The majority voter block 300 of the SDQPSK data detector as shown in FIG. 7 may be implemented with similar logic gates of the SDPSK data detector as shown in FIGS. 2 and 3.

As described in the foregoing, the multi-symbol differential detector of data of either a symmetric differential phase shift keying (SDPSK) modulation format or a symmetric differential quadriphase shift keying (SDQPSK) modulation format as constructed according to the principles of the present invention may advantageously be provided for significant performance gain while realizing significant decoder design gate saving of up to 90% from conventional brute force lookup and brute force comparison techniques. The multi-chip differential data detector design may advantageously be implemented with minimal hardware. Lastly, the new SDPSK or SDQPSK data detector design may be conveniently packaged in modular forms.

While there have been illustrated and described what are considered to be preferred embodiments of the present invention, it will be understood by those skilled in the art that various changes and modifications may be made, and equivalents may be substituted for elements thereof without departing from the true scope of the present invention. For example, while the improved data detector may be described for the SDPSK or SDQPSK data modulation, the present invention is not limited thereto. In addition, other implementations of the phase-difference encoder block, the decoder block and the majority voter block may be available for performing those intended functions. Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A data detector for decoding incoming modulated data, comprising:
    a phase-difference encoder arranged to encode phase-differences of at least four consecutive input phases of said incoming modulated data during a multiple-chip observation interval to produce a received vector of a predetermined number of data bits and parity bits;
    a decoder arranged to decode the received vector to produce multiple bit decisions by mapping the received vector with a set of ideal vectors; and
    a majority voter arranged to choose a bit estimate from the multiple bit decisions by way of a majority rule to produce a final detected symbol from said incoming modulated data during said multiple-chip observation interval.

2. A data detector as claimed in claim 1, further comprising a plurality of chip delay units arranged to delay an input phase of said incoming modulated data to said phase-difference encoder by one-chip, two-chips, and three-chips during said multiple-chip observation interval of at least four consecutive phases of said incoming modulated data.

3. A data detector as claimed in claim 2, wherein said incoming modulated data corresponds to data modulated in a symmetric differential phase shift keying (SDPSK) format, and said predetermined number of the received vector corresponds to 3 data bits and 3 parity bits.

4. A data detector as claimed in claim 3, wherein said multiple-chip observation interval corresponds to a four-chip observation interval with each symbol containing one bit, and said set of ideal vectors corresponds to the number of all phase transition possibilities over said four-chip observation interval.

5. A data detector as claimed in claim 4, wherein said phase-difference encoder comprises a plurality of subtractors and XOR gates arranged to determine the phase differences of an input phase of said incoming modulated data delayed by one-chip, two-chips and three-chips during said multiple-chip observation interval of at least four consecutive phases, and to encode the phase differences to produce said received vector.

6. A data detector as claimed in claim 3, wherein said decoder corresponds to a four-chip decoder implemented using a 64×3 read-only-memory (ROM).

7. A data detector as claimed in claim 3, wherein said majority voter is a 3-to-1 logic circuit for making a final decision using said majority rule to produce said final bit symbol from said incoming modulated data during said multiple-chip observation interval of a clock cycle.

8. A data detector as claimed in claim 3, wherein said majority voter comprises a plurality of AND gates and an OR gate to produce said final bit symbol from said incoming modulated data during said multiple-chip observation interval.

9. A data detector as claimed in claim 3, wherein said decoder comprises:
    a vector unit arranged to provide the received vector from said phase-difference encoder for decoding operations;
    a first selection unit arranged to receive the data bits of the received vector;
    a first ROM look-up table arranged to provide the parity bits of the corresponding ideal vector;
    a first mismatch counter arranged to count the number of mismatches between the lookup output and the parity bits of the received vector;
    a second selection unit arranged to receive the parity bits of the received vector;
    a second ROM look-up table arranged to provide the data bits of the corresponding ideal vector;
    a second mismatch counter arranged to count the number of mismatches between the lookup output and the data bits of the received vector; and
    a comparator arranged to pick the ideal vector that is closest to the received vector so as to produce the parallel multiple bit decisions.

10. A data detector as claimed in claim 1, wherein said incoming modulated data corresponds to data modulated in a symmetric differential quadri-phase shift keying (SDQPSK) format, and said predetermined number of the received vector corresponds to 6 data bits and 6 parity bits.

11. A data detector as claimed in claim 10, wherein said multiple-chip observation interval corresponds to a 4-chip observation interval with each symbol containing 2-bits, and said set of ideal vectors corresponds to the number of all phase transition possibilities over said 4-chip observation interval.

12. A data detector as claimed in claim 11, wherein said phase-difference encoder comprises a plurality of subtractors and XOR gates arranged to determine the phase differences of an input phase of said incoming modulated data delayed by one-chip, two-chips and three-chips during said multiple-chip observation interval, and to encode the phase differences to produce said received vector.

13. A data detector as claimed in claim 11, wherein said majority voter corresponds to parallel 3-to-1 logic circuits for making a final decision using said majority rule to produce said final bit symbol from said incoming modulated data during said multiple-chip observation interval of a clock cycle.

14. A data detector as claimed in claim 11, wherein said decoder comprises:
    a vector unit arranged to provide the received vector of 12-bits from said phase-difference encoder for decoding operations;
    a first plurality of selection unit arranged to receive the data bits of the received vector with the appropriate bits inverted;
    a first plurality of ROM look-up tables arranged to provide the parity bits of the corresponding ideal vector;
    a first plurality of mismatch counters arranged to count the number of mismatches between the lookup outputs and the parity bits of the received vector;
    a second plurality of selection units arranged to receive the parity bits of the received vector with the appropriate bits inverted;

a second plurality of ROM look-up tables arranged to provide the data bits of the corresponding ideal vector;

a second plurality of mismatch counters arranged to count the number of mismatches between the lookup outputs and the data bits of the received vector; and a comparator arranged to pick the ideal vector that is closest to the received vector of 12-bits so as to produce the parallel detected symbols.

15. A data detector for decoding incoming data modulated in symmetric differential phase shift keying format, comprising:

chip delay units arranged to delay an input phase of said incoming data modulated in said symmetric differential phase shift keying format during a multi-chip observation interval of at least four consecutive phases of said incoming data;

a phase-difference encoder arranged to encode phase-differences of the four consecutive phases of said incoming data to produce a received vector of 6-bits containing 3 data bits and 3 parity bits;

a decoder arranged to decode the received vector to produce parallel 3-bit decisions by mapping the received vector with a set of ideal vectors; and a majority voter arranged to choose a bit estimate from the parallel 3-bit decisions by way of a majority vote to produce a final detected symbol from said incoming data during said multi-chip observation interval.

16. A data detector as claimed in claim 15, wherein said phase-difference encoder comprises a plurality of subtractors and XOR gates arranged to determine the phase differences of an input phase of said incoming data delayed by one-chip, two-chips and three-chips during said multi-chip observation interval at least four consecutive phases of said incoming data, and to encode the phase differences to produce said received vector.

17. A data detector as claimed in claim 15, wherein said decoder corresponds to a 4-chip decoder implemented using a 64×3 read-only-memory (ROM).

18. A data detector as claimed in claim 15, wherein said majority voter is a 3-to-1 logic circuit for making a final decision using said majority vote to produce said final bit symbol from said incoming data during said multi-chip observation interval of a clock cycle.

19. A data detector as claimed in claim 15, wherein said majority voter comprises a plurality of AND gates and an OR gate to produce said final bit symbol from said incoming data during said multi-chip observation interval.

20. A data detector as claimed in claim 15, wherein said decoder comprises:

a vector unit arranged to provide the received vector from said phase-difference encoder for decoding operations;

a first selection unit arranged to receive the data bits of the received vector;

a first ROM look-up table arranged to provide the parity bits of the corresponding ideal vector;

a first mismatch counter arranged to count the number of mismatches between the lookup output and the parity bits of the received vector;

a second selection unit arranged to receive the parity bits of the received vector;

a second ROM look-up table arranged to provide the data bits of the corresponding ideal vector;

a second mismatch counter arranged to count the number of mismatches between the lookup output and the data bits of the received vector; and a comparator arranged to pick the ideal vector that is closest to the received vector so as to produce the parallel 3-bit decisions.

21. A data detector for decoding incoming data modulated in a symmetric differential quadriphase shift keying format, comprising:

chip delay units arranged to delay an input phase of said incoming data modulated in said symmetric differential quadriphase shift keying format by one-chip, two-chips and three-chips during a multi-chip observation interval of at least four consecutive phases of said incoming data;

a phase-difference encoder arranged to encode phase-differences of the four consecutive phases of said incoming data to produce a received vector of 12-bits containing 6 data bits and 6 parity bits;

a decoder arranged to decode the received vector to produce parallel 6-bit decisions by mapping the received vector with a set of ideal vectors; and a majority voter arranged to choose a bit estimate from the parallel 6-bit decisions by way of a majority vote to produce final detected symbols from said incoming data during said multi-chip observation interval.

22. A data detector as claimed in claim 21, wherein said phase-difference encoder comprises a plurality of subtractors and XOR gates arranged to determine the phase differences of an input phase of said incoming data delayed by said one-chip, two-chips and three-chips during said multi-chip observation interval, and to encode the phase differences to produce said received vector.

23. A data detector as claimed in claim 21, wherein said decoder comprises:

a vector unit arranged to provide the received vector of 12-bits from said phase-difference encoder for decoding operations;

a first plurality of selection unit arranged to receive the data bits of the received vector with the appropriate bits inverted;

a first plurality of ROM look-up tables arranged to provide the parity bits of the corresponding ideal vector;

a first plurality of mismatch counters arranged to count the number of mismatches between the lookup outputs and the parity bits of the received vector;

a second plurality of selection units arranged to receive the parity bits of the received vector with the appropriate bits inverted;

a second plurality of ROM look-up tables arranged to provide the data bits of the corresponding ideal vector;

a second plurality of mismatch counters arranged to count the number of mismatches between the lookup output and the data bits of the received vector; and a comparator arranged to pick the ideal vector that is closest to the received vector of 12-bits so as to produce parallel detected symbols.

24. A process of decoding incoming data modulated from a transmitter, comprising the steps of:

delaying an input phase of said incoming data by one-chip, two-chips and three-chips during a multi-chip observation interval of at least four consecutive phases of said incoming data;

encoding phase-differences of said at least four consecutive input phases of said incoming data during said multi-chip observation interval to produce a received vector of a predetermined number of data bits and parity bits;

decoding the received vector to produce multiple bit decisions by mapping the received vector with a set of ideal vectors; and determining a bit estimate from the multiple bit decisions by way of a majority rule to produce a final detected symbol from said incoming data during said multi-chip observation interval.

25. A process as claimed in claim 24, comprising modulating said incoming data in a symmetric differential phase shift keying (SDPSK) format, wherein said predetermined number of the received vector corresponds to 3 data bits and 3 parity bits.

26. A process as claimed in claim 25, wherein said multi-chip observation interval corresponds to a 4-chip observation interval with each chip containing one bit, and said set of ideal vectors corresponds to the number of all phase transition possibilities over said 4-chip observation interval.

27. A process as claimed in claim 24, comprising modulating said incoming data in a symmetric differential quadriphase shift keying (SDQPSK) format, wherein said predetermined number of the received vector corresponds to 6 data bits and 6 parity bits.

28. A process as claimed in claim 27, wherein said multi-chip observation interval corresponds to a 4-chip observation interval with each chip containing 2-bits, and said set of ideal vectors corresponds to the number of all phase transition possibilities over said 4-chip observation interval.

* * * * *